(12) United States Patent
Huang-Fu et al.

(10) Patent No.: US 11,399,308 B2
(45) Date of Patent: Jul. 26, 2022

(54) ERROR HANDLING ON MISSING CONFIGURATION FOR INTER-SYSTEM CHANGE IN MOBILE COMMUNICATIONS

(71) Applicant: MediaTek Inc., Hsinchu (TW)

(72) Inventors: Chien-Chun Huang-Fu, Hsinchu (TW); Shang-Ru Mo, Hsinchu (TW); Chi-Hsien Chen, Hsinchu (TW)

(73) Assignee: MediaTek Inc.

( * ) Notice: Subject to any disclaimer, the term of this patent is extended or adjusted under 35 U.S.C. 154(b) by 2 days.

(21) Appl. No.: 16/680,325

(22) Filed: Nov. 11, 2019

(65) Prior Publication Data

US 2020/0154307 A1 May 14, 2020

Related U.S. Application Data

(60) Provisional application No. 62/769,021, filed on Nov. 19, 2018, provisional application No. 62/758,743, filed on Nov. 12, 2018.

(51) Int. Cl.
| | | |
|---|---|---|
| *H04W 80/02* | (2009.01) | |
| *H04W 28/04* | (2009.01) | |
| *H04W 76/19* | (2018.01) | |
| *H04W 28/02* | (2009.01) | |
| *H04W 28/06* | (2009.01) | |

(52) U.S. Cl.
CPC ....... *H04W 28/04* (2013.01); *H04W 28/0268* (2013.01); *H04W 28/06* (2013.01); *H04W 76/19* (2018.02); *H04W 80/02* (2013.01)

(58) Field of Classification Search
CPC ..... H04W 28/04; H04W 80/02; H04W 76/19; H04W 28/0268; H04W 28/06; H04W 28/0257; H04W 76/20
See application file for complete search history.

(56) References Cited

U.S. PATENT DOCUMENTS

| | | | |
|---|---|---|---|
| 2018/0198837 A1 | 7/2018 | Kurian et al. | |
| 2018/0198867 A1 | 7/2018 | Dao et al. | |
| 2019/0124181 A1* | 4/2019 | Park | H04W 74/0833 |
| 2019/0159157 A1* | 5/2019 | Gupta | H04W 60/005 |

(Continued)

FOREIGN PATENT DOCUMENTS

| | | |
|---|---|---|
| CN | 1738285 A | 2/2006 |
| CN | 107690161 A | 2/2018 |

(Continued)

OTHER PUBLICATIONS

3GPP (3GPP TR 24.890v15.1.0, Technical Specification Group Core Network and Terminals; 5G System—Phase 1; CT WG1 Aspects)—Mar. 2018.*

(Continued)

*Primary Examiner* — Lakeram Jangbahadur
(74) *Attorney, Agent, or Firm* — Han IP PLLC; Andy M. Han

(57) ABSTRACT

Various examples and schemes pertaining to error handling on missing configuration for inter-system change in mobile communications are described. An apparatus performs a protocol data unit (PDU)-related procedure with a wireless network. The apparatus detects whether there is an error in the PDU-related procedure and the apparatus handles the error in response to detecting the error in the PDU-related procedure.

4 Claims, 3 Drawing Sheets

(56) References Cited

U.S. PATENT DOCUMENTS

| | | | | |
|---|---|---|---|---|
| 2019/0261449 A1* | 8/2019 | Kim | .................. | H04W 48/16 |
| 2020/0037386 A1* | 1/2020 | Park | .................. | H04W 76/18 |

FOREIGN PATENT DOCUMENTS

| | | | |
|---|---|---|---|
| CN | 108260162 A | 7/2018 | |
| CN | 108353310 A | 7/2018 | |
| CN | 108370600 A | 8/2018 | |
| CN | 108513726 A | 9/2018 | |
| CN | 108605269 A | 9/2018 | |
| CN | 108632917 A | 10/2018 | |
| CN | 108702723 A | 10/2018 | |

OTHER PUBLICATIONS

3GPP TS 24.501v15.1.1 Technical Specification Group Core Network and Terminals; Non-Access-Stratum (NAS) protocol for 5G System (5GS) Sep. 2018.*

3GPP501 (3GPP TR 24.501v2.0.0, Technical Specification Group Core Network and Terminals; Non-Access-Stratum (NAS) protocol for 5G System (5GS), Jun. 2018).*

China National Intellectual Property Administration, International Search Report and Written Opinion for PCT/CN2019/117474, dated Jan. 21, 2020.

China National Intellectual Property Administration, International Search Report and Written Opinion for PCT/CN2019/119453, dated Jan. 19, 2020.

China National Intellectual Property Administration, International Search Report and Written Opinion for PCT/CN2019/119452, dated Feb. 10, 2020.

3GPP, 3rd Generation Partnership Project; Technical Specification Group Core Network and Terminals; 5G System—Phase 1; CT WG1 Aspects (Release 15), 3GPP TR 24.890 V15.1.0, Mar. 2018.

Taiwan Intellectual Property Office, Office Action for Taiwan Patent Application No. 108141885, dated Dec. 22, 2020.

Taiwan Intellectual Property Office, Office Action for Taiwan Patent Application No. 108140942, dated Jan. 29, 2020.

"3rd Generation Partnership Project; Technical Specificatino Group Core Network and Terminals; 5G System—Phase 1; CT WG1 Aspects (Release 15)", 3GPP TR 24.890 V15.1.0, Mar. 28, 2018, Ch. 6-12.

* cited by examiner

ERROR HANDLING ON MISSING CONFIGURATION FOR INTER-SYSTEM CHANGE IN MOBILE COMMUNICATIONS

CROSS REFERENCE TO RELATED PATENT APPLICATION(S)

The present disclosure is part of a non-provisional application claiming the priority benefit of U.S. Patent Application Nos. 62/758,743 and 62/769,021, filed on 12 Nov. 2018 and 19 Nov. 2018, respectively, the contents of which being incorporated by reference in their entirety.

TECHNICAL FIELD

The present disclosure is generally related to mobile communications and, more particularly, to techniques pertaining to error handling on missing configuration for inter-system change in mobile communications.

BACKGROUND

Unless otherwise indicated herein, approaches described in this section are not prior art to the claims listed below and are not admitted as prior art by inclusion in this section.

Under current $3^{rd}$ Generation Partnership Project (3GPP) specifications for 5th Generation (5G) mobile communications, in case that information for authentication and authorization of a protocol data unit (PDU) session by an external data network (DN) in a session management (SM) PDU DN request container information element (IE) is not compliant with a local policy, the network would reject a PDU session establishment request from a user equipment (UE).

Under current 3GPP specifications, when the UE is in the N1 mode, the network may create or modify a mapped Evolved Packet System (EPS) bearer context in a PDU session modification procedure and a PDU session establishment procedure. In case there are errors, then the corresponding EPS bearer context cannot be successfully established after an inter-system change from N1 mode to S1 mode. One of such errors can be invalid or missing mandatory parameters (e.g., mapped EPS quality of service (QoS) parameters or traffic flow template. Another of such errors can be invalid parameters (e.g., mapped extended EPS QoS parameters, an access point name aggregate maximum bit rate (APN-AMBR) or an extended APN-AMBR.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is propose various concepts, solutions, schemes, techniques, designs and methods to address aforementioned issues.

In one aspect, a method may involve a processor of an apparatus performing a PDU-related procedure with a wireless network. The method may also involve the processor detecting whether there is an error in the PDU-related procedure. The method may further involve the processor handling the error responsive detecting the error in the PDU-related procedure.

It is noteworthy that, although description provided herein may be in the context of certain radio access technologies, networks and network topologies such as Ethernet, the proposed concepts, schemes and any variation(s)/derivative(s) thereof may be implemented in, for and by other types of radio access technologies, networks and network topologies such as, for example and without limitation, 5G, New Radio (NR), Long-Term Evolution (LTE), LTE-Advanced, LTE-Advanced Pro, narrowband (NB), narrowband Internet of Things (NB-IoT), Wi-Fi and any future-developed networking and communication technologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to error handling on missing configuration for inter-system change in mobile communications. According to the present disclosure, a number of possible solutions may be implemented separately or jointly. That is, although these possible solutions may be described below separately, two or more of these possible solutions may be implemented in one combination or another.

Figure 1:
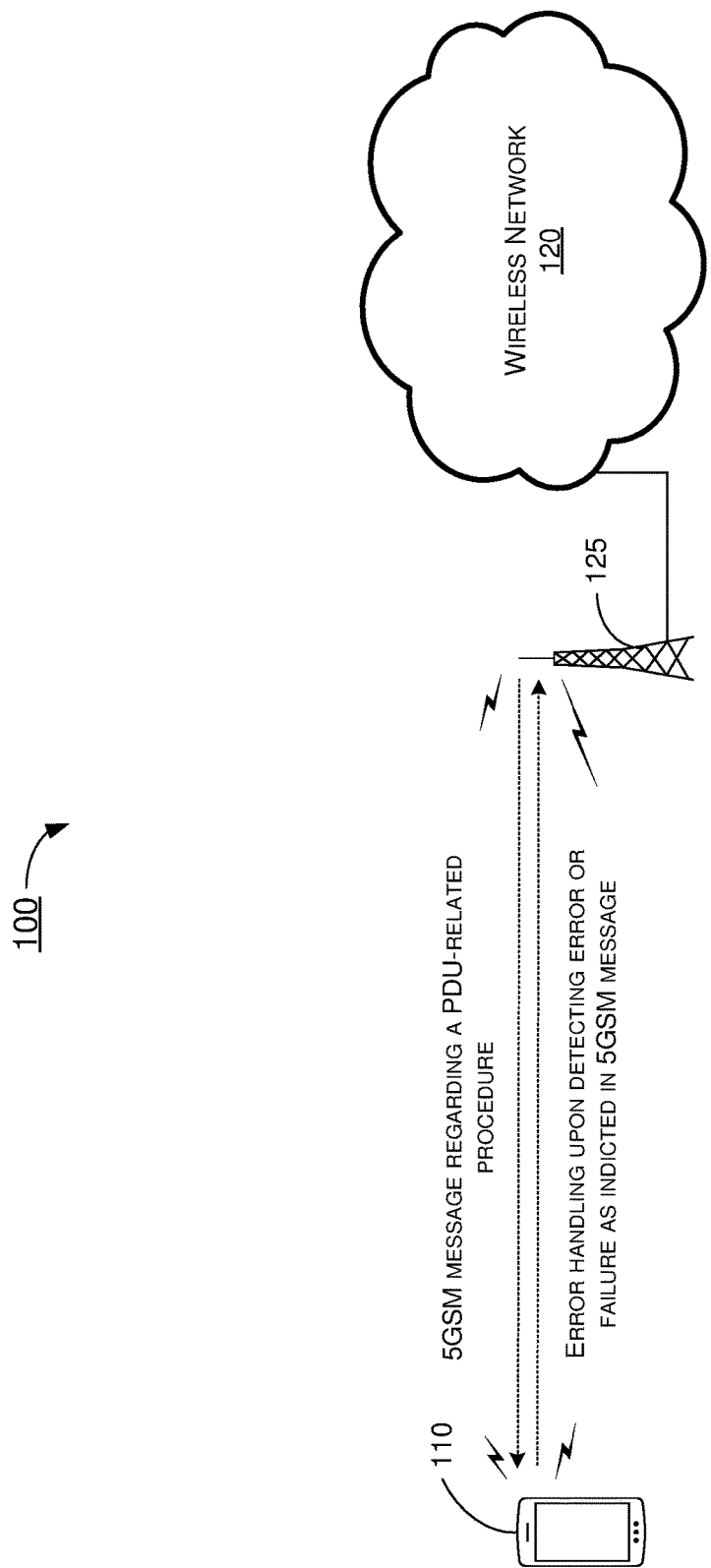
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. Referring to FIG. 1, network environment 100 may involve a UE 110 in wireless communication with a wireless network 120 (e.g., a 5G NR mobile network). UE 110 may initially be in wireless communication with wireless network 120 via a base station or network node 125 (e.g., an eNB, gNB or transmit-receive point (TRP)). In network environment 100, UE 110 and wireless network 120 may implement various schemes pertaining to error handling on missing configuration for inter-system change in mobile communications in accordance with the present disclosure, as described herein.

Under a proposed scheme in accordance with the present disclosure, UE 110 may detect whether there is error in a mapped EPS bearer context provided by wireless network 120 in a PDU session modification procedure and a PDU session establishment procedure. Under the proposed scheme, in an event that an error is detected, UE 110 may delete the erroneous or otherwise problematic mapped EPS bearer context. For instance, UE 110 may delete the problematic mapped EPS bearer context by using a PDU session modification procedure with a 5GSM cause #85 ("invalid mapped EPS bearer identity").

The mapped EPS bearer context IE is defined in Technical Specification (TS) 24.501, subclause 9.11.4.8, of the 3GPP specification. As defined in the specification, operation code bits (bits 8 and 7 of octet 7) may have bits "00" (reserved), "01" (="create new EPS bearer"), "10" (="Delete existing EPS bearer"), or "11" (="Modify existing EPS bearer"). As defined, an EPS parameter identifier field is used to identify each EPS parameter included in the EPS parameters list and it contains the hexadecimal coding of the EPS parameter identifier. Bit 8 of the EPS parameter identifier field contains the most significant bit and bit 1 contains the leases significant bit. Currently, the following EPS parameter identifiers are specified: 01H (mapped EPS QoS parameters), 02H (mapped extended EPS QoS parameters), 03H (traffic flow template), 04H (APN-AMBR), and 05H (extended APN-AMBR).

In the context of a PDU session modification procedure, UE 110 may check to see whether the operation code is "create new EPS bearer" or "modify existing EPS bearer" and whether the resultant mapped EPS bearer context has mandatory parameter(s) being invalid or missing (e.g., mapped EPS QoS parameters or traffic flow template). Alternatively, or additionally, UE 110 may check to see whether the resultant mapped EPS bearer context has invalid parameter(s) (e.g., invalidity in mapped extended EPS QoS parameter(s), an APN-AMBR or an extended APN-AMBR). Under the proposed scheme, upon a positive detection, UE 110 may handle the error by initiating a PDU session modification procedure after sending a PDU SESSION MODIFICATIO COMPLETE message for the ongoing PDU session modification procedure. For instance, UE 110 may transmit a PDU SESSION MODIFICATION REQUEST message to network node 125 to delete the mapped EPS bearer context with a 5GSM cause #85 ("invalid mapped EPS bearer identity"). In TS 24.301 of the 3GPP specification, the mandatory IE for an EPS bearer is defined, for example, in Table 8.3.3.1 and Table 8.3.6.1.

In the context of a PDU session establishment procedure, UE 110 may check to see whether the operation code is "create new EPS bearer" and whether the resultant mapped EPS bearer context has mandatory parameter(s) being invalid or missing (e.g., mapped EPS QoS parameters or traffic flow template). Alternatively, or additionally, UE 110 may check to see whether the resultant mapped EPS bearer context has invalid parameter(s) (e.g., invalidity in mapped extended EPS QoS parameter(s), an APN-AMBR or an extended APN-AMBR). Under the proposed scheme, upon a positive detection, UE 110 may handle the error by initiating a PDU session modification procedure. For instance, UE 110 may transmit a PDU SESSION MODIFICATION REQUEST message to network node 125 to delete the mapped EPS bearer context with a 5GSM cause #85 ("invalid mapped EPS bearer identity").

Illustrative Implementations

Figure 2:
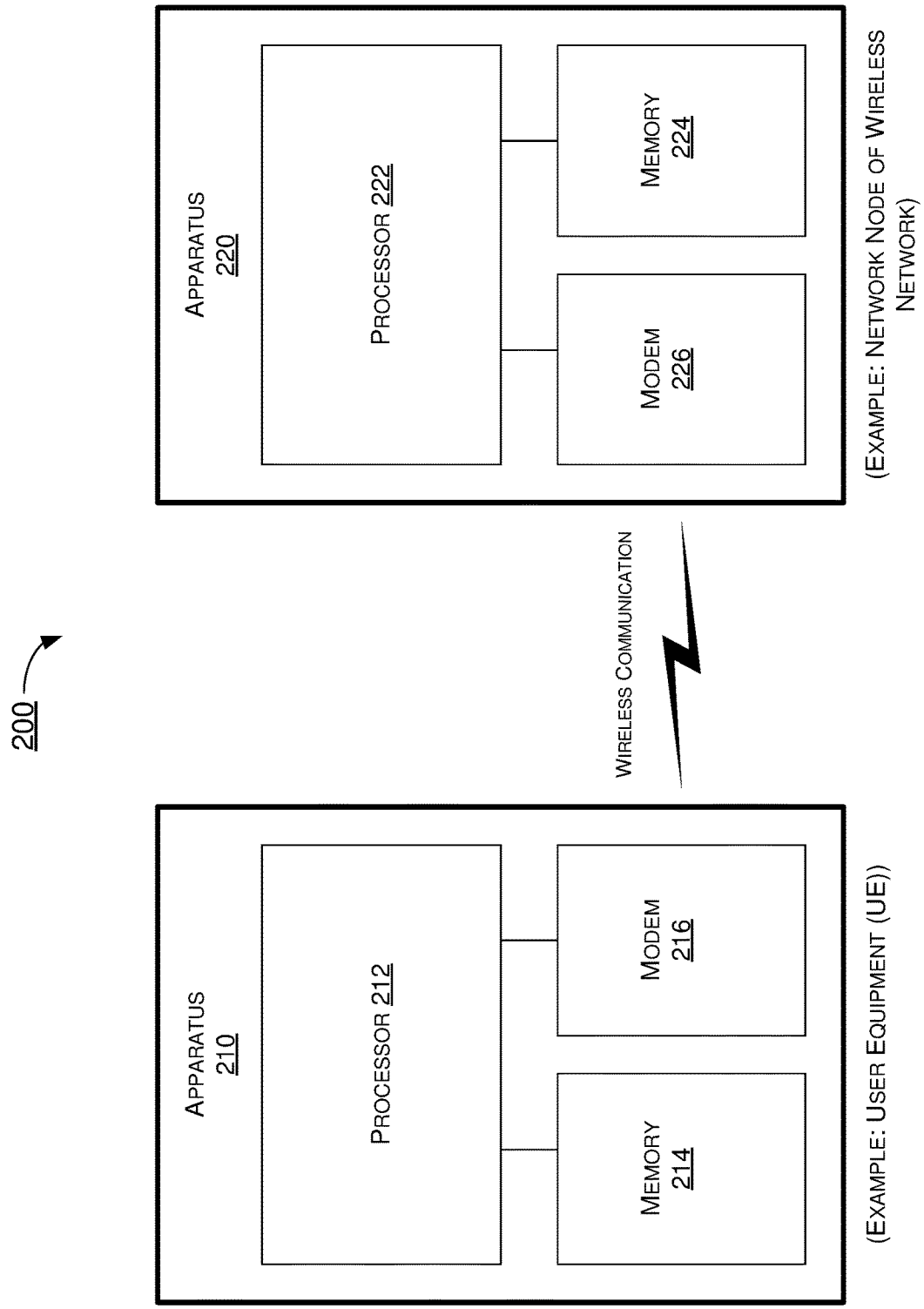
FIG. 2 is a block diagram of an example communication system in accordance with an implementation of the present disclosure.

FIG. 2 illustrates an example communication system 200 having an example apparatus 210 and an example apparatus 220 in accordance with an implementation of the present disclosure. Each of apparatus 210 and apparatus 220 may perform various functions to implement schemes, techniques, processes and methods described herein pertaining to error handling on missing configuration for inter-system change in mobile communications, including various schemes described above as well as processes described below.

Each of apparatus 210 and apparatus 220 may be a part of an electronic apparatus, which may be a UE such as a vehicle, a portable or mobile apparatus, a wearable apparatus, a wireless communication apparatus or a computing apparatus. For instance, each of apparatus 210 and apparatus 220 may be implemented in an electronic control unit (ECU) of a vehicle, a smartphone, a smartwatch, a personal digital assistant, a digital camera, or a computing equipment such as a tablet computer, a laptop computer or a notebook computer. Each of apparatus 210 and apparatus 220 may also be a part of a machine type apparatus, which may be an IoT or NB-IoT apparatus such as an immobile or a stationary apparatus, a home apparatus, a wire communication apparatus or a computing apparatus. For instance, each of apparatus 210 and apparatus 220 may be implemented in a smart thermostat, a smart fridge, a smart door lock, a wireless speaker or a home control center. Alternatively, each of apparatus 210 and apparatus 220 may be implemented in the form of one or more integrated-circuit (IC) chips such as, for example and without limitation, one or more single-core processors, one or more multi-core processors, one or more complex-instruction-set-computing (CISC) processors, or one or more reduced-instruction-set-computing (RISC) processors. Each of apparatus 210 and apparatus 220 may include at least some of those components shown in FIG. 2 such as a processor 212 and a processor 222, respectively. Each of apparatus 210 and apparatus 220 may further include one or more other components not pertinent to the proposed scheme of the present disclosure (e.g., internal power supply, display device and/or user interface device), and, thus, such component(s) of each of apparatus 210 and apparatus 220 are neither shown in FIG. 2 nor described below in the interest of simplicity and brevity.

In some implementations, at least one of apparatus 210 and apparatus 220 may be a part of an electronic apparatus, which may be a vehicle, a roadside unit (RSU), network node or base station (e.g., eNB, gNB or TRP), a small cell, a router or a gateway. For instance, at least one of apparatus 210 and apparatus 220 may be implemented in a vehicle in a vehicle-to-vehicle (V2V) or vehicle-to-everything (V2X) network, an eNodeB in an LTE, LTE-Advanced or LTE-Advanced Pro network or in a gNB in a 5G, NR, IoT or NB-IoT network. Alternatively, at least one of apparatus 210 and apparatus 220 may be implemented in the form of one or more IC chips such as, for example and without limitation, one or more single-core processors, one or more multi-core processors, or one or more CISC or RISC processors.

In one aspect, each of processor 212 and processor 222 may be implemented in the form of one or more single-core processors, one or more multi-core processors, or one or more CISC or RISC processors. That is, even though a singular term "a processor" is used herein to refer to processor 212 and processor 222, each of processor 212 and processor 222 may include multiple processors in some implementations and a single processor in other implementations in accordance with the present disclosure. In another aspect, each of processor 212 and processor 222 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 212 and processor 222 is a special-purpose machine specifically designed, arranged and configured to perform specific tasks including error handling on missing configuration for inter-system change in mobile communications in accordance with various implementations of the present disclosure.

In some implementations, apparatus 210 may also include a wireless transceiver 216 coupled to processor 212 and capable of wirelessly transmitting and receiving data over a wireless link (e.g., a 3GPP connection or a non-3GPP connection). In some implementations, apparatus 210 may further include a memory 214 coupled to processor 212 and capable of being accessed by processor 212 and storing data therein. In some implementations, apparatus 220 may also include a wireless transceiver 226 coupled to processor 222 and capable of wirelessly transmitting and receiving data over a wireless link (e.g., a 3GPP connection or a non-3GPP connection). In some implementations, apparatus 220 may further include a memory 224 coupled to processor 222 and capable of being accessed by processor 222 and storing data therein. Accordingly, apparatus 210 and apparatus 220 may wirelessly communicate with each other via transceiver 216 and transceiver 226, respectively.

To aid better understanding, the following description of the operations, functionalities and capabilities of each of apparatus 210 and apparatus 220 is provided in the context of an NR communication environment in which apparatus 210 is implemented in or as a wireless communication device, a communication apparatus, a UE or an IoT device (e.g., UE 110) and apparatus 220 is implemented in or as a base station or network node (e.g., network node 125).

In one aspect of error handling on missing configuration for inter-system change in mobile communications in accordance with the present disclosure, processor 212 of apparatus 210 may perform, via transceiver 216, a PDU-related procedure with a wireless network (e.g., wireless network 120) via apparatus 220 as a network node (e.g., network node 125). Additionally, processor 212 may detect whether there is an error in the PDU-related procedure. Moreover, processor 212 may handle the error in response to detecting the error in the PDU-related procedure.

In some implementations, in detecting whether there is an error in the PDU-related procedure, processor 212 may perform certain operations. For instance, processor 212 may receive, via transceiver 216, a 5GSM message from the wireless network, with the 5GSM message including parameters for an inter-system change. Additionally, processor 212 may determine whether at least one of the parameters is invalid or missing.

In some implementations, the PDU-related procedure may be related to creating or modifying a mapped EPS bearer context. In such cases, in handling the error, processor 212 may handle the error in the mapped EPS bearer context by performing either or both of: (a) transmitting a message to the wireless network to indicate the error in the mapped EPS bearer context; and (b) deleting the mapped EPS bearer context.

In some implementations, the PDU-related procedure may include a PDU session modification procedure. In such cases, in detecting whether there is an error in the PDU-related procedure, processor 212 may perform certain operations. For instance, processor 212 may check whether an operation code indicates creating a new EPS bearer or modifying an existing EPS bearer. Additionally, processor 212 may check whether a mapped EPS bearer context includes one or more invalid or missing mandatory parameters or one or more invalid parameters. In some implementations, in checking whether the mapped EPS bearer context includes one or more invalid or missing mandatory parameters processor 212 may check whether the mapped EPS bearer context includes one or more invalid or missing mandatory parameters in mapped EPS QoS parameters or a traffic flow template. Moreover, in checking whether the mapped EPS bearer context includes one or more invalid parameters, processor 212 may check whether the mapped EPS bearer context includes one or more invalid parameters in mapped extended EPS QoS parameters, APN-AMBR or an extended APN-AMBR. In such cases, in handling the error, processor 212 may perform certain operations. For instance, processor 212 may transmit, via transceiver 216, a PDU SESSION MODIFICATION COMPLETE message to the wireless network for an ongoing PDU session modification procedure. Furthermore, processor 212 may initiate a new PDU session modification procedure. In some implementations, in initiating the new PDU session modification procedure, processor 212 may transmit, via transceiver 216, a PDU SESSION MODIFICATION REQUEST message to the wireless network to delete the mapped EPS bearer context with a 5GSM cause number indicating invalid mapped EPS bearer identity.

In some implementations, the PDU-related procedure may include a PDU session establishment procedure. In such cases, in detecting whether there is an error in the PDU-related procedure, processor 212 may perform certain operations. For instance, processor 212 may check whether an operation code indicates creating a new EPS bearer. Additionally, processor 212 may check whether a mapped EPS bearer context includes one or more invalid or missing mandatory parameters or one or more invalid parameters. In some implementations, in checking whether the mapped EPS bearer context includes one or more invalid or missing mandatory parameters, processor 212 may check whether the mapped EPS bearer context includes one or more invalid or missing mandatory parameters in mapped EPS QoS parameters or a traffic flow template. Moreover, in checking whether the mapped EPS bearer context includes one or more invalid parameters, processor 212 may check whether the mapped EPS bearer context includes one or more invalid parameters in mapped extended EPS QoS parameters, an APN-AMBR or an extended APN-AMBR. In such cases, in handling the error, processor 212 may initiate a PDU session modification procedure. In some implementations, in initiating the PDU session modification procedure, processor 212 may transmit, via transceiver 216, a PDU SESSION MODIFICATION REQUEST message to the wireless network to delete the mapped EPS bearer context with a 5GSM cause number indicating invalid mapped EPS bearer identity.

Illustrative Processes

Figure 3:
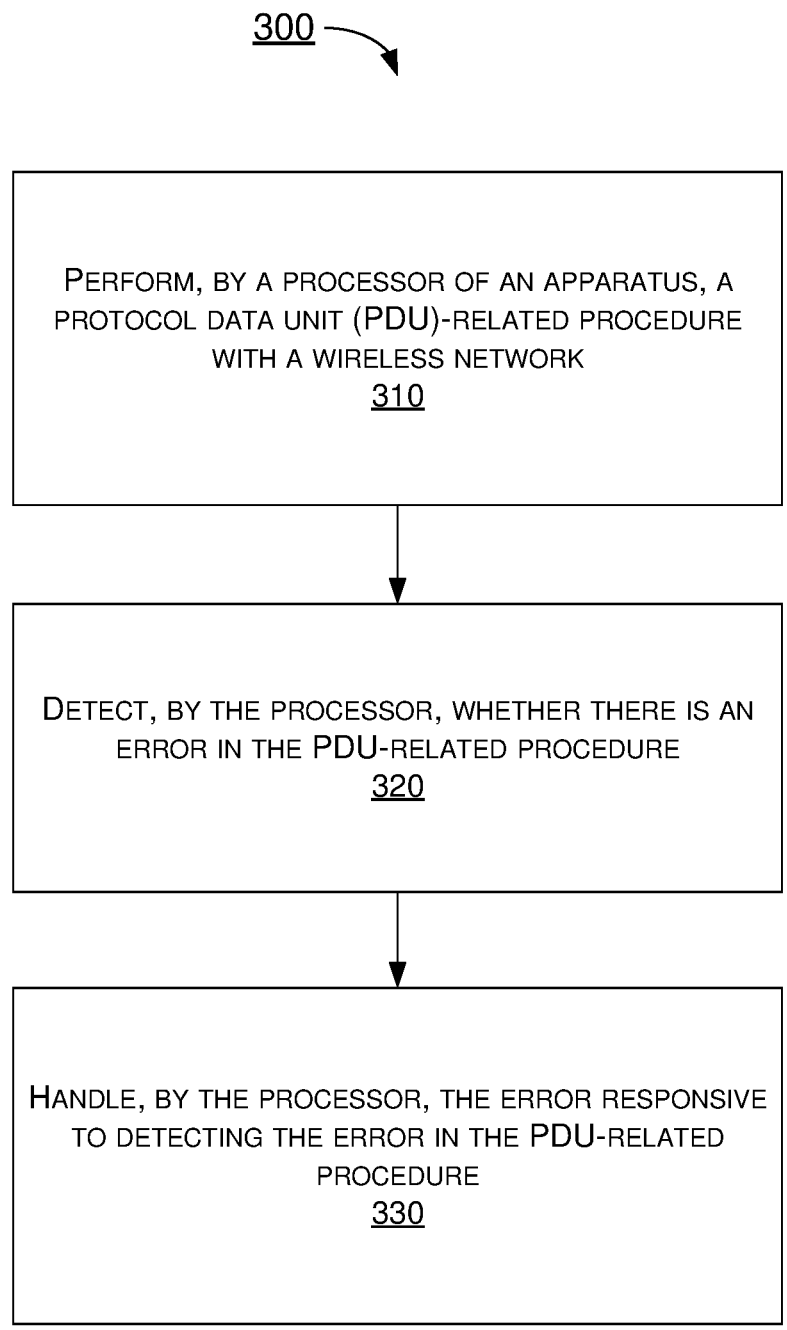
FIG. 3 is a flowchart of an example process in accordance with an implementation of the present disclosure.

FIG. 3 illustrates an example process 300 in accordance with an implementation of the present disclosure. Process 300 may be an example implementation of the proposed schemes described above with respect to error handling on missing configuration for inter-system change in mobile communications in accordance with the present disclosure. Process 300 may represent an aspect of implementation of features of apparatus 210 and apparatus 220. Process 300 may include one or more operations, actions, or functions as illustrated by one or more of blocks 310, 320 and 330. Although illustrated as discrete blocks, various blocks of process 300 may be divided into additional blocks, combined into fewer blocks, or eliminated, depending on the desired implementation. Moreover, the blocks of process 300 may be executed in the order shown in FIG. 3 or, alternatively, in a different order. Process 300 may also be repeated partially or entirely. Process 300 may be implemented by apparatus 210, apparatus 220 and/or any suitable wireless communication device, UE, RSU, base station or machine type devices. Solely for illustrative purposes and without limitation, process 300 is described below in the context of apparatus 210 as UE 110 and apparatus 220 as network node 125. Process 300 may begin at block 310.

At 310, process 300 may involve processor 212 of apparatus 210 performing, via transceiver 216, a PDU-related procedure with a wireless network (e.g., wireless network 120) via apparatus 220 as a network node (e.g., network node 125). Process 300 may proceed from 310 to 320.

At 320, process 300 may involve processor 212 detecting whether there is an error in the PDU-related procedure. Process 300 may proceed from 320 to 330.

At 330, process 300 may involve processor 212 handling the error in response to detecting the error in the PDU-related procedure.

In some implementations, in detecting whether there is an error in the PDU-related procedure, process 300 may involve processor 212 performing certain operations. For instance, process 300 may involve processor 212 receiving, via transceiver 216, a 5GSM message from the wireless network, with the 5GSM message including parameters for an inter-system change. Additionally, process 300 may involve processor 212 determining whether at least one of the parameters is invalid or missing.

In some implementations, the PDU-related procedure may be related to creating or modifying a mapped EPS bearer context. In such cases, in handling the error, process 300 may involve processor 212 handling the error in the mapped EPS bearer context by performing either or both of: (a) transmitting a message to the wireless network to indicate the error in the mapped EPS bearer context; and (b) deleting the mapped EPS bearer context.

In some implementations, the PDU-related procedure may include a PDU session modification procedure. In such cases, in detecting whether there is an error in the PDU-related procedure, process 300 may involve processor 212 performing certain operations. For instance, process 300 may involve processor 212 checking whether an operation code indicates creating a new EPS bearer or modifying an existing EPS bearer. Additionally, process 300 may involve processor 212 checking whether a mapped EPS bearer context includes one or more invalid or missing mandatory parameters or one or more invalid parameters. In some implementations, in checking whether the mapped EPS bearer context includes one or more invalid or missing mandatory parameters, process 300 may involve processor 212 checking whether the mapped EPS bearer context includes one or more invalid or missing mandatory parameters in mapped EPS QoS parameters or a traffic flow template. Moreover, in checking whether the mapped EPS bearer context includes one or more invalid parameters, process 300 may involve processor 212 checking whether the mapped EPS bearer context includes one or more invalid parameters in mapped extended EPS QoS parameters, APN-AMBR or an extended APN-AMBR. In such cases, in handling the error, process 300 may involve processor 212 performing certain operations. For instance, process 300 may involve processor 212 transmitting, via transceiver 216, a PDU SESSION MODIFICATION COMPLETE message to the wireless network for an ongoing PDU session modification procedure. Furthermore, process 300 may involve processor 212 initiating a new PDU session modification procedure. In some implementations, in initiating the new PDU session modification procedure, process 300 may involve processor 212 transmitting, via transceiver 216, a PDU SESSION MODIFICATION REQUEST message to the wireless network to delete the mapped EPS bearer context with a 5GSM cause number indicating invalid mapped EPS bearer identity.

In some implementations, the PDU-related procedure may include a PDU session establishment procedure. In such cases, in detecting whether there is an error in the PDU-related procedure, process 300 may involve processor 212 performing certain operations. For instance, process 300 may involve processor 212 checking whether an operation code indicates creating a new EPS bearer. Additionally, process 300 may involve processor 212 checking whether a mapped EPS bearer context includes one or more invalid or missing mandatory parameters or one or more invalid parameters. In some implementations, in checking whether the mapped EPS bearer context includes one or more invalid or missing mandatory parameters, process 300 may involve processor 212 checking whether the mapped EPS bearer context includes one or more invalid or missing mandatory parameters in mapped EPS QoS parameters or a traffic flow template. Moreover, in checking whether the mapped EPS bearer context includes one or more invalid parameters, process 300 may involve processor 212 checking whether the mapped EPS bearer context includes one or more invalid parameters in mapped extended EPS QoS parameters, an APN-AMBR or an extended APN-AMBR. In such cases, in handling the error, process 300 may involve processor 212 initiating a PDU session modification procedure. In some implementations, in initiating the PDU session modification procedure, process 300 may involve processor 212 transmitting, via transceiver 216, a PDU SESSION MODIFICATION REQUEST message to the wireless network to delete the mapped EPS bearer context with a 5GSM cause number indicating invalid mapped EPS bearer identity.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   performing, by a processor of an apparatus implemented in a user equipment (UE), a protocol data unit (PDU)-related procedure with a wireless network;
   detecting, by the processor while the UE is in a 5th Generation System session management (5GSM) procedure, whether there is an error in the PDU-related procedure; and
   handling, by the processor, the error before switching to an Evolved Packet System (EPS) from a 5th Generation System (5GS) responsive to detecting the error in the PDU-related procedure,
   wherein the PDU-related procedure comprises a PDU session modification procedure,
   wherein the detecting whether there is an error in the PDU-related procedure comprises:
      checking whether an operation code indicates creating a new EPS bearer or modifying an existing EPS bearer; and
      detecting an error in an EPS Session Management (ESM) parameter by:
         checking whether a mapped EPS bearer context includes an invalid or missing mapped EPS quality of service (QoS) parameter or an invalid or missing traffic flow template; or
         checking whether the mapped EPS bearer context includes an invalid mapped extended EPS QoS parameter, an invalid access point name aggregate maximum bit rate (APN-AMBR) or an invalid extended APN-AMBR, and
   wherein the handling of the error comprises:
      transmitting a PDU SESSION MODIFICATION COMPLETE message to the wireless network for an ongoing PDU session modification procedure; and
      initiating a new PDU session modification procedure by transmitting a PDU SESSION MODIFICATION REQUEST message to the wireless network to delete the mapped EPS bearer context with a 5GSM cause number.

2. The method of claim 1, wherein the detecting whether there is an error in the PDU-related procedure further comprises:
   receiving a 5GSM message from the wireless network, the 5GSM message comprising parameters for an inter-system change; and
   determining whether at least one of the parameters is invalid or missing.

3. An apparatus implemented in a user equipment (UE), comprising:
- a transceiver configured to wirelessly communicate with a wireless network; and
- a processor coupled to the transceiver, the processor configured to perform operations comprising:
  - performing, via the transceiver, a protocol data unit (PDU)-related procedure with a wireless network;
  - detecting, via the transceiver and while the UE is in a 5th Generation System session management (5GSM) procedure, whether there is an error in the PDU-related procedure; and
  - handling, via the transceiver, the error before switching to an Evolved Packet System (EPS) from a 5th Generation System (5GS) responsive to detecting the error in the PDU-related procedure,
- wherein the PDU-related procedure comprises a PDU session establishment procedure,
- wherein the detecting whether there is an error in the PDU-related procedure comprises:
  - checking whether an operation code indicates creating a new EPS bearer or modifying an existing EPS bearer; and
  - detecting an error in an EPS Session Management (ESM) parameter by:
    - checking whether a mapped EPS bearer context includes an invalid or missing mapped EPS quality of service (QoS) parameter or an invalid or missing traffic flow template; or
    - checking whether the mapped EPS bearer context includes an invalid mapped extended EPS QoS parameter, an invalid access point name aggregate maximum bit rate (APN-AMBR) or an invalid extended APN-AMBR, and
- wherein the handling of the error comprises initiating a new PDU session modification procedure by transmitting a PDU SESSION MODIFICATION REQUEST message to the wireless network to delete the mapped EPS bearer context with a 5GSM cause number.

4. The method of claim 3, wherein the detecting whether there is an error in the PDU-related procedure further comprises:
- receiving a 5GSM message from the wireless network, the 5GSM message comprising parameters for an inter-system change; and
- determining whether at least one of the parameters is invalid or missing.

* * * * *